United States Patent Office 3,528,006
Patented Sept. 8, 1970

3,528,006
APPARATUS FOR AUTOMATICALLY TESTING THE PULSE PROPAGATION CHARACTERISTICS OF DIGITAL ELECTRONIC CIRCUITS
David C. Davis, Jr., and John M. Ritter II, Clearwater, Fla., assignors to Sperry Rand Corporation, a corporation of Delaware
Filed Apr. 1, 1968, Ser. No. 717,686
Int. Cl. G01r 31/28
U.S. Cl. 324—73                      7 Claims

ABSTRACT OF THE DISCLOSURE

A testing apparatus for electronic circuits contains registers for storing information to be strobed into the circuit under test and a correct result register for storing the results to be expected from an acceptable circuit. A first strobe pulse is used to strobe test signals into the circuit. This strobe pulse is also delayed for a time equal to the normal propagation time of the test signals through the circuit under test. Information read out of the circuit under test at the time of the delayed strobe pulse is compared with information in the correct result register.

BACKGROUND OF THE INVENTION

This invention relates to electronic circuit testers and more specifically to a high speed automatic tester for use with digital logic circuits and the like. Many varieties of equipment for testing digital electronic circuits are known in the prior art. In general, however, such equipment does not provide means for automatically checking the propagation time nor the fall time of input signals passing through the circuit under test. Furthermore, such equipment does not contain means for evaluating the quality of the digital pulses produced by the circuit under test.

It is a principal object of the present invention to provide equipment for testing digital electronic circuits that will test the pulse quality and propagation time of the signals from the circuit under test as well as the switching function of that circuit.

SUMMARY OF THE INVENTION

The objects of the present invention are achieved by utilizing a double strobe technique in which a strobe pulse is passed through an accurately controlled selective time delay. The original strobe pulse is used to read information into the circuit under test. The resulting information from the circuit under test is compared with reference signals of predetermined amplitude at the time of occurrence of the delayed strobe pulse and then compared with stored signals having the proper binary value. The circuit under test is accepted only if all output signals from that circuit compare favorably with the reference signals at the time of the delayed strobe and further have the proper binary values.

DESCRIPTION OF THE PREFERRED EMBODIMENT

Figure 1:
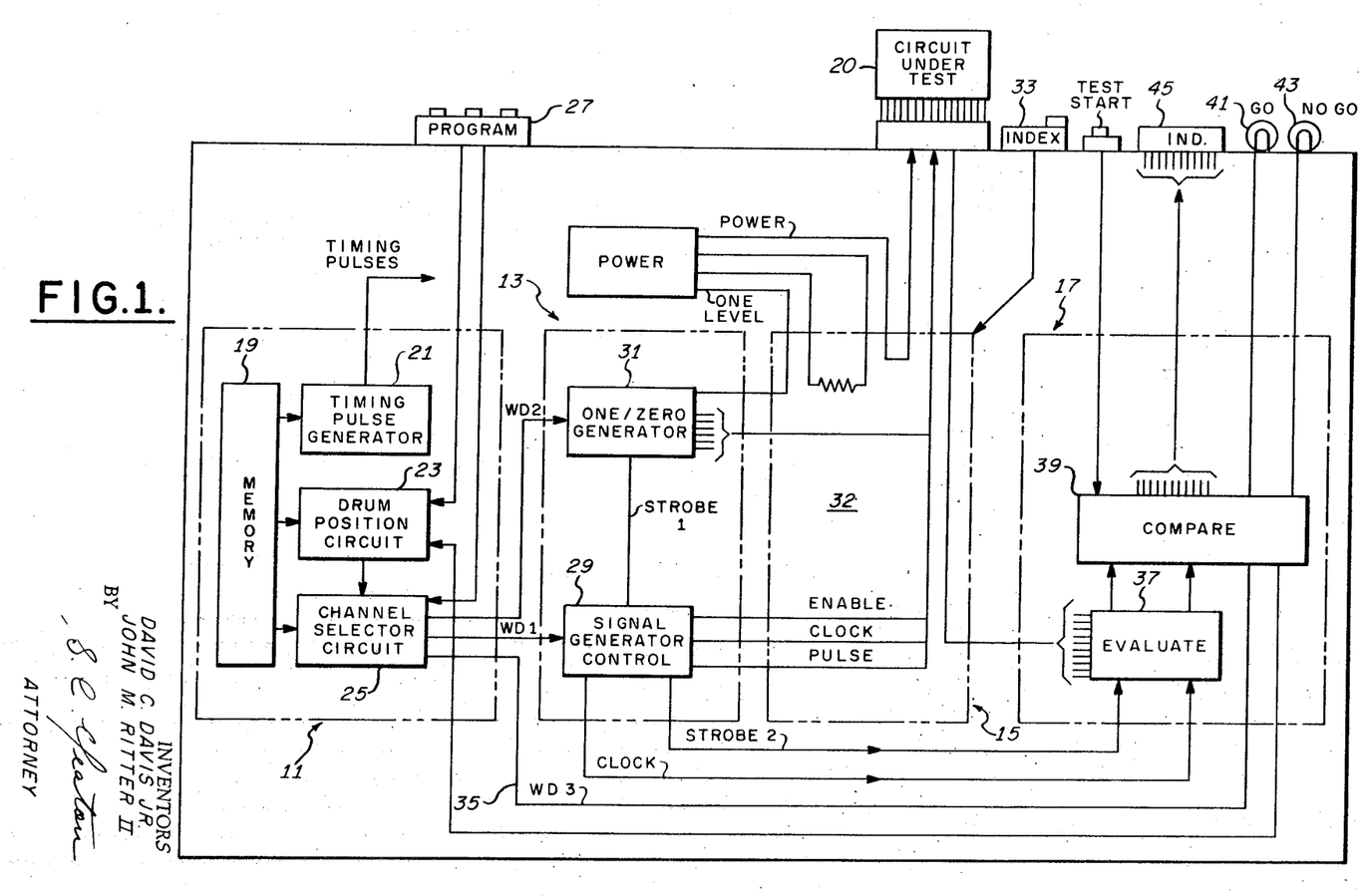
FIG. 1 is a functional block diagram useful in explaining the mode of operation of the tester.

Referring now to FIG. 1, the tester contains four subsystems. These are the control and memory subsystem 11, the stimuli subsystem 13, the interface subsystem 15 and the comparator subsystem 17.

The memory and control subsystem 11 stores test procedure data and controls the operation of the tester. A memory 19 contains information governing timing for the various tests, information as to the memory address of the proper testing voltages, information pertaining to the voltages to be applied to the specimen 20 being tested and information as to the correct results to be expected from such test specimens.

As presently preferred, a magnetic drum element is used for the memory 19. A typical memory drum contains a first track for storing timing pulses to be used in the various subsystems. Each track on this particular drum stores 48 words, each containing 25 bits of information. These words are grouped into three-word groups for the purpose of an individual test, thus permitting sixteen groups to be stored on a single track.

A timing pulse generator 21 is used to read the timing pulse track continuously. This produces the basic timing pulses that control and sequence the tester operation. In a typical tester, such a generator contains five counter states into which the timing pulses are fed serially. The generator also contains various gating circuits to provide desired timing pulses and groups of timing pulses to suitable circuit elements. This grouping of pulses will be described later.

A drum position circuit 23 reads and processes the group position and word position data from a position track on the drum memory. This track contains the group addresses for the various tests so as to control a channel selector circuit 25. A manually actuated program entrance switch 27 supplies digitally coded information regarding the address of the desired test to the drum position circuit and the channel selector circuit.

The test data is stored in a number of data tracks in the memory. The typical tester mentioned previously, contains a drum memory with 72 data tracks. The channel selector circuit 25 contains an array of gates that permits information to pass from the selected data track in response to a digitally coded signal from the switch 27 and a READ signal from the drum position circuit 23.

For purposes of illustration, assume that the test data pertaining to a given test specimen is stored at word group 8 of data track 50. The operator sets the program entrance switch 27 in accordance with this address. This opens the gating means corresponding to data track 50 in the channel selector circuit and supplies binary information corresponding to word group 8 to the drum position circuit. When the drum position circuit reads information corresponding to word group 8 on the position track, the drum position circuit supplies a MATCH signal to the channel selector circuit, thus permitting the three corresponding words from the selected data track to be applied to the appropriate circuit elements in the stimuli and comparator subsystems.

Each of these three words is read into separate registers. In general, the information in the first word is subsequently used to determine the nature of the clock and pulse trains to be applied to the test specimen; the information in the second word is used to determine the binary value of the signals to be applied to various inputs of the test specimen; the information in the third word is used as a reference in determining whether or not the output signals from the specimen conform to design standards.

The stimuli subsystem sets up all input signals and controls their application to the specimen to be tested. This subsystem contains a signal generator control circuit 29 which receives data word 1 from the channel selector circuit 25. In response to information in data word 1, the circuit 29 determines the voltage level of the binary ONE signal to be used. The circuit 29 also determines the pulse width of the binary ONE signal to be applied to the specimen, the clock frequency, the number of pulses in a desired pulse train, and the routing of these pulse trains. Finally, the circuit 29 produces strobe pulses to gate input signals to the specimen and to test the propagation time through the specimen.

The stimuli subsystem 13 also contains a ONE-ZERO generator 31. This generator accepts the data word 2 from the channel selector circuit 25 and uses this word to determine which inputs on the specimen are to receive a binary ONE. In a typical tester, the generator 31 can supply up to 24 simultaneous ONE bits to the interface subsystem.

The interface subsystem 15 contains routing means to steer the various signals from the stimuli subsystem to the specimen and signals from the specimen to the comparator subassembly. The interface subsystem also helps determine the binary ONE level to be used for a particular test.

In its presently preferred form, the interface subsystem contains a group of circuit boards. Each board is designed to route the signals to be used in testing a specific specimen. The design of these boards is straightforward in that they serve to interconnect appropriate circuit elements for predetermined test conditions. In general, a circuit board functions as a program storage and routing means. Such a board is indicated functionally as element 32 in FIG. 1.

The circuit boards may be physically plugged into the tester. However, it is convenient to employ a switching means functionally indicated as index selector 33 for this purpose. A suitable switch is described in Pat No. 3,272,933 to B. J. Henderson and assigned to the present assignee. This switch is capable of storing a large number of circuit boards and switching any one of these boards into exterior circuits.

The comparator subsystem 17 receives output data from the specimen being tested as well as "correct" test data corresponding to the data that would be obtained from a perfect specimen. These data are obtained as a correct test result from the control and memory subsystem 11 by means of a line 35 during the data word 3 time interval.

The comparator subsystem evaluates the information received from the specimen in an evaluate circuit 37 and compares these signals with the correct test results in a compare circuit 39. If the signals from the specimen match the correct test results, a GO lamp 41 is illuminated. If the tests do not match, a NO-GO lamp 43 is illuminated and the number of the test that failed is displayed on an indicator 45.

CONTROL AND MEMORY SUBSYSTEM

Figure 2:
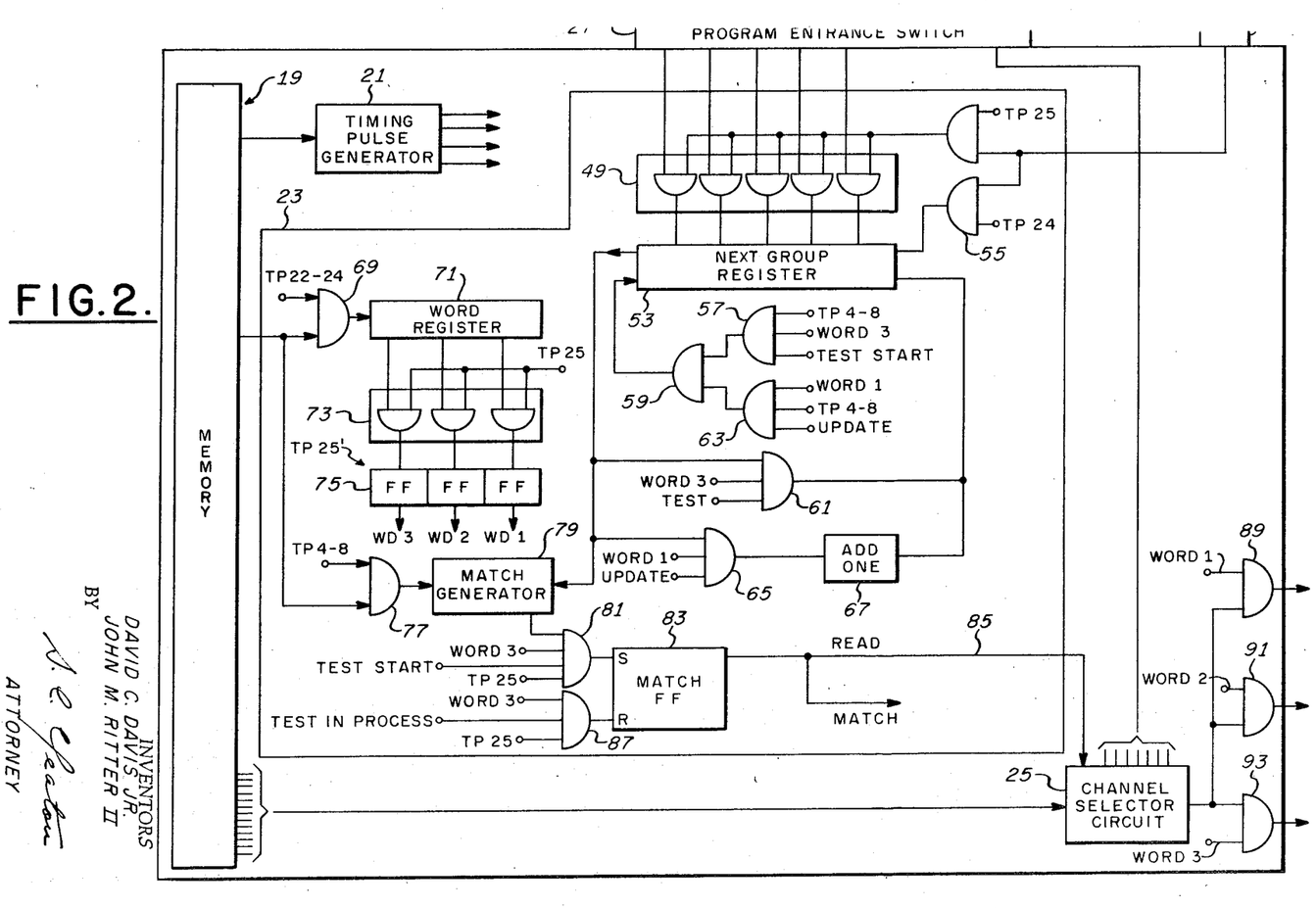
FIG. 2 is a block diagram illustrating the operation of the memory and control subsystem of a presently preferred embodiment of the invention.

The control and memory subsystem is depicted in more detail in FIG. 2.

The timing pulse generator 21 contains a number of individual output terminals so that individual pulses or groups of pulses may be applied to the proper circuit components in other parts of the tester.

In the presently preferred embodiment, an individual output pulse may be designated by the position of that pulse in the pulse train. Thus, one terminal supplies a TP1 pulse each time that the timing pulse generator 21 reads the first timing pulse in a given word from the timing track on the magnetic drum 19. Individual output terminals are also available for the fourth timing pulse (TP4), as well as TP23, TP24 and TP25.

The timing pulse generator also contains gating circuits so that a single output terminal may be used to supply a series of five pulses consisting of the fourth through eighth timing pulses (TP4-TP8). Another output terminal is arranged to supply timing pulses 1 through 24 (TP1-TP24). Still another output terminal is arranged to supply a series of three timing pulses consisting of the 22nd through 24th timing pulses (TP22-TP24).

Finally, in the preferred embodiment, an individual output terminal is arranged to supply a short duration pulse during the first portion of the timing pulse 25. This short pulse may be derived by any convenient means such as differentiating means responsive to the leading edge of TP25. For convenience, this short pulse may be designated TP25'.

Information regarding a selected test is originally applied to the drum position circuit 23 by manipulation of the program entrance switch 27. Before a test is started, the operator manipulates this switch to enable the AND gates in the bank 49 corresponding to the number of the word group representing the desired test. The operator also closes the READ IN switch 51. During the occurrence of the first subsequent TP24 pulse, a signal is supplied to a next group register 53 through a gate 55. The next group register 53 is composed of a shift register into which information can be read from the group of AND gates 49. Upon the occurrence of the following TP25 pulse, the selected individual gates in the group 49 are actuated so that the information originally programmed into the tester through the program entrance switch 27 now appears in the next group register 53.

At the beginning of a test, a TEST START signal will be derived from the comparator subsystem as will be described. When the TP4-TP8 pulses of WORD 3 are thereafter detected on the position track of the drum memory, a signal is applied through the gates 57 and 59 so as to strobe information out of the next group register 53. During this time, a recirculate gate 61 is also enabled so that the same information can be recirculated and again stored in the register 53.

At the conclusion of a test, the comparator subsystem produces an UPDATE signal. This signal, together with the TP4-TP8 pulses of WORD 1 opens a gate 63 which again serves to strobe information out of the register 53. At this time, however, the gate 61 is not enabled since the comparator subsystem no longer produces a TEST signal. The UPDATE signal from the comparator subsystem, however, enables a gate 65 which permits information from the register 53 to pass to an ADD ONE circuit 67. When this occurs, the number being read out of the register 53 is increased one unit. Thus, at the end of a test, the number stored in the register 53 is increased by one unit and is thus prepared to process the following test.

Information from the position track on the drum 19 is applied to a word register input gate 69. This gate is enabled each time the timing pulse generator supplies TP22-TP24 pulses. The output of the gate 69 is applied to a three-bit word register 71. During the first word in a given group, a 001 is supplied to the word register. During the occurrence of WORD 2 in a given group, the word reigster receives a 010, and during the occurrence of a third word in a given group, the word register receives a 100.

During each word, a TP1 pulse resets the register.

The binary state of each stage in the register 71 is applied to individual gates in the word register bank 73. The output from each of these gates is applied to individual flip-flops in a word storage flip-flop 75.

A TP25' pulse is used to reset the word storage flip-flop. A TP25 pulse is also applied to each of the gates in the bank 73. Since the TP25' pulse is shorter than the TP25 pulse, the word storage flip-flop 75 is reset and new information is read into this word storage flip-flop during the occurrence of a TP25 pulse.

Thus steady D.C. signals representing WORDS 1, 2, or 3 are provided by the word storage flip-flops 75 during the entire period that the corresponding word is being read from the memory.

Information from the position track is also applied through a gate 77. Gate 77 is connected to one side of a match generator 79. The other side of the match generator is coupled to the next group register 53.

The gate 77 is enabled by timing pulses TP4 through TP8. Thus, pulses are applied from the gate 77 and from the register during the occurrence of these five pulses.

The match generator 79 will produce no output if the words applied to its two terminals are different from each other. However, when the word read from the position track of the drum 19 agrees with the word being read out of the next group register 53, the match generator 79 produces an output pulse whch is applied to a gate 81

If a TEST START signal is being supplied from the comparator subsystem, TP25 of WORD 3 produces an output signal from the gate 81 which serves to set a match flip-flop 83. This produces a steady READ signal on the line 85 which enables those gates selected by the program entrance switch 27 in the channel selector circuit 25.

When the match flip-flop 83 is set, a MATCH signal is also supplied to various elements in the remaining subsystems.

After information has been read into the various registers in the stimuli and comparator subsystems in response to WORDS 1-3, a TEST IN PROCESS signal is produced in the comparator subsystem. This serves to enable a gate 87 in the input of the match flip-flop 83 so that this flip-flop can be reset during the occurrence of the next TP25 pulse of WORD 3. This serves to terminate the READ and MATCH signal from the match flip-flop and to produce a NO MATCH signal. The output of the channel selector circuit is applied to the gates 89, 91 and 93. Gate 89 is enabled by a WORD 1 signal, gate 91 is enabled by a WORD 2, and gate 93 is enabled by a WORD 3 signal.

The output of the gate 89 is applied to a signal generator register in the stimuli subsystem. The output of the gate 91 is applied to a ONE/ZERO generator register in the stimuli subsystem. The output from the gate 93 is applied to a correct result register in the comparator subsystem.

STIMULI SUBSYSTEM

Figure 3:
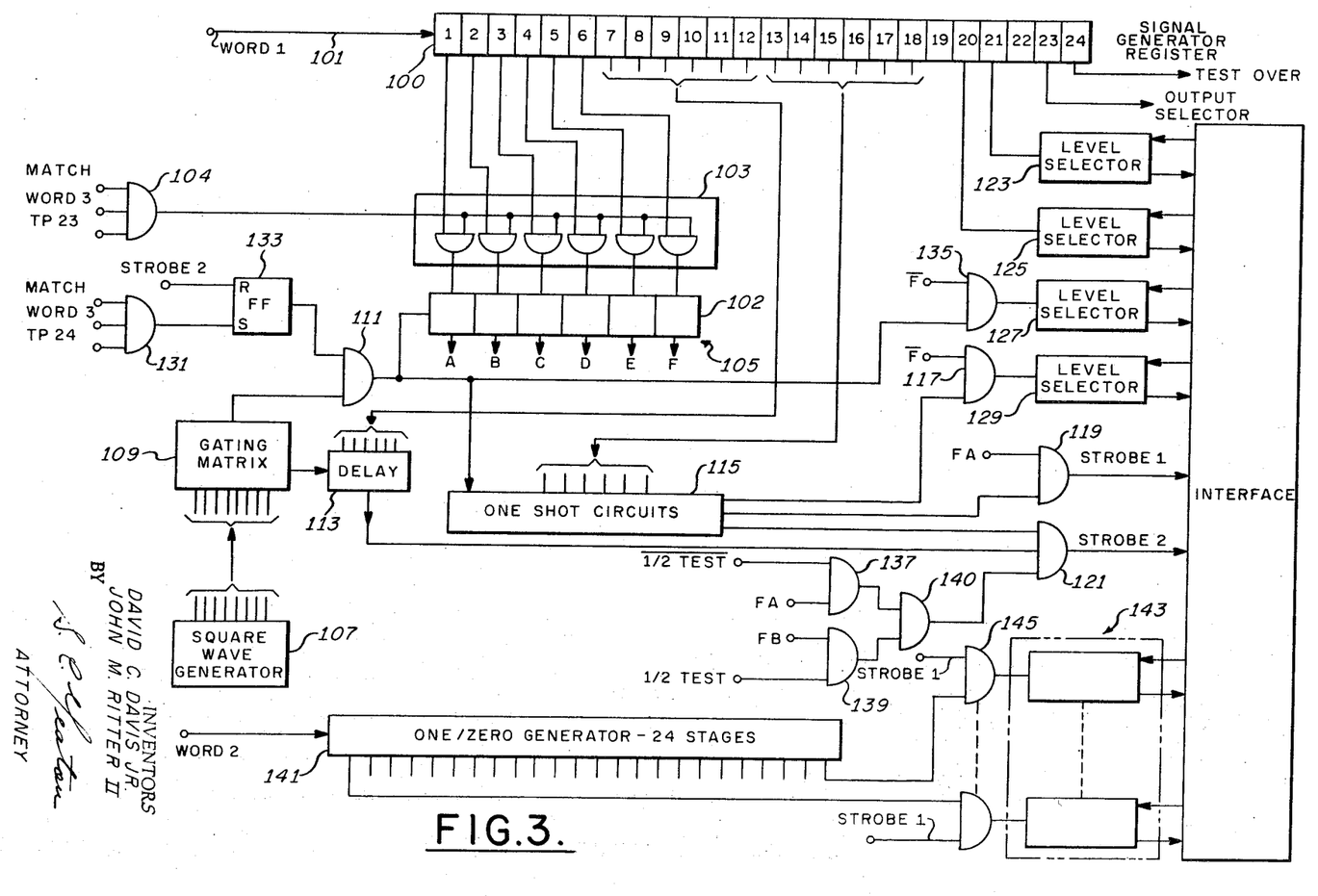
FIG. 3 is a block diagram illustrating the operation of the stimuli subsystem of a presently preferred embodiment of the invention.

A typical stimuli subsystem is depicted in FIG. 3. A WORD 1 from gate 89 in the control and memory subsystem is applied to a signal generator register 100 through a line 101. The signal generator register is basically a shift register containing 24 stages to accommodate the 24 bits in WORD 1. The first six stages of the register 100 are coupled to a six-stage square wave counter 102 through a group of square wave counter gates 103. The information in the first six stages of the register 100 is used to preset the counter 102 in response to a signal applied to the group of gates 103 through an input gate 104. Such a signal is derived during TP23 of WORD 3 in the presence if a match signal from the flip-flop 83 in the memory and control subsystem. Signals indicating the binary state of the various stages in the counter 102 may be taken from the terminals 105.

A square wave generator 107 provides suitable square wave trains for the stimuli subsystem. In order to provide flexibility, the square wave generator contains several crystal oscillators, each generating a different frequency. Each crystal oscillator drives a multistage counter which may be used to divide the frequency of that particular oscillator by a known factor. Taps may be taken off the stages of these counters so that additional sub-multiple frequencies may be obtained as required for various tests.

The individual frequencies are applied to a gating matrix 109. The gates in this matrix are enabled in accordance with a control signal from the interface subsystem so that a pulse train having a selected repetition rate may be applied to the counter 102 through the gate 111 and to a delay means 113.

Thus, the interface subsystem circuitry is used to select a given frequency for testing the selected specimen. A bank of one shot circuits 115 is coupled to receive a signal from the gate 111. These one shot circuits supply pulses of discrete durations. They are individually enabled in response to the information contained in stages 13-18 of the signal generator register 100. Thus, a signal from the gate 111 will actuate selected one shot circuits so as to provide an output pulse to the gates 117, 119 and 121 having a pulse width determined by the particlar one shot circuits that have been enabled.

The signal generator register 100 of the stimuli subsystem provides output signals through the level selectors 123, 125, 127 and 129 as well as a STROBE 1 and a STROBE 2 pulse.

These level selectors provide individual output voltages having levels that can be adjusted to suit the needs of a particular test. They may, for example, contain an NPN transistor in which the base element is driven from the stimuli subsystem. The output signal may be taken from the collector terminal of this transistor. Resistors included in the circuit board inserted into the interface subsystem may be selected to provide a resistance divider that will establish suitable ZERO levels when the transistor is saturated and suitable ONE levels when the transistor is cut off.

The level selectors 125 and 123 are energized in accordance with the information stored in stages 20 and 21, respectively, of the register 100. These level selectors supply fixed level voltages to points in the interface subsystem.

The level selector 127 provides a train of square wave clock pulses for use in the interface subsystem. The voltage level of these pulses is determined by the circuit components in the interface subsystem so as to meet the needs of the particular test being conducted.

The repetition rate of the square wave pulse train is selected by enabling specific gates in the matrix 109 in accordance with enabling voltages supplied by the interface subsystem.

The commencement of the square wave pulse train is synchronized through the gate 131 and the flip-flop 133. After a MATCH signal is received from the match flip-flop 83 in the memory and control subsystem, the following TP24 of WORD 3 sets the flip-flop 133 and enables the gate 111. This permits square waves from the square wave generator 107 to flow to the level selector 127.

The number of pulses in a given square wave train is governed by the square wave counter 102. A gate 135 is coupled to receive a signal from the last stage of the counter 102. After this stage is switched to its binary ONE state, the gate 135 closes and the flow of square wave pulses to the level selector 127 is stopped.

The binary state of the counter is determined by the value to which it is preset plus the number of pulses applied to the counter through the gate 111. Thus, a pulse train having a desired number of pulses is obtained by presetting the counter to a value such that the desired number of pulses will cause the counter to reach a binary state that will close the gate 135.

A train of adjustable width pulses is also made available to the interface subsystem through the level selector 129. These pulses are synchronized with the square wave pulse train since they are derived from the square wave pulse train acting through the bank of one shot circuits 115. The number of pulses in the train is the same as the number of square wave pulses since the train is terminated by means of the gate 117 responding to the same signal that closes the gate 135.

Each of the one shot circuits in the bank 115 provides output pulses having a unique pulse width. The one shot circuits are actuated by the square wave pulses from the gate 111 and enabled in accordance with the information stored in the stages 13-18 of the signal generator register 100.

The signal generator register portion of the stimuli subsystem also cooperates in producing STROBE 1 and STROBE 2 pulses.

The purpose of these STROBE pulses is to check propagation delay and pulse characteristics. Although pulse shape, and rise time have some significance, the two characteristics of major interest are the trigger propagation delay and the fall time propagation delay after the input level is removed.

The trigger propagation delay is the difference in time between the time that an input trigger pulse crosses the trigger threshold and the time that the output pulse crosses the threshold. The fall time propagation delay is similarly defined. The STROBE 1 and STROBE 2 pulses are timed to check these characteristics. The signal generator control circuit determines whether these characteristics are checked and specifies how they are checked.

The STROBE 1 pulse is an enable pulse that permits information from WORD 2 to be strobed into the test specimen. STROBE 2 occurs at a precisely adjustable period of time after the occurrence of STROBE 1. STROBE 2 is used to gate output signals from the test specimen into the output register in the comparator subsystem.

The STROBE 1 pulse is produced at the output of gate 119 and occurs when the square wave counter reaches a condition in which the first and last stages of that counter are in the binary ONE state.

The STROBE 2 pulse is delayed an additional amount by the adjustable delay means 113. The delay and pulse width provided by the delay means 113 is determined by the information being stored in stages 7–12 of the signal generator register 100.

The delay means comprises a basic countdown circuit having individual stages enabled by the bits of information stored in the stages 7–12 of the signal generator register. The STROBE 2 pulse is further under the control of signals from AND gates 137 and 139.

Ordinarily, the first series of tests run on a test specimen utilize a ½ TEST signal produced in the comparator subsystem and applied to the gate 137. Signals from the first and last stages of the square wave counter 102 are also applied to this gate. This permits a signal to pass through the gate 140 to the gate 121 and provides a STROBE 2 pulse at a definite time after a STROBE 1 pulse as determined by the STROBE 2 delay means 113.

This delay for STROBE 2 typically may be adjusted within the range of $\frac{1}{16}$ and $\frac{5}{16}$ of a timing pulse. A particular delay is chosen so that the STROBE 2 pulse occurs during the time that an output pulse would be expected to occur in order to test for acceptable propagation time through the test specimen. The STROBE 2 pulse width is chosen so that the output gating pulse is shorter than the interval between the latest possible arrival of the output pulse and the earliest possible fall time of the output pulse. This insures both a dynamic test of the ability of the test specimen to drive a rated load and a timing test to insure that the pulse arriving within tolerance limits.

If a test specimen is found acceptable under this series of tests, the comparator subsystem produces a ½ TEST signal and the series is repeated in order to test the fall time propagation delay after the input level is removed.

When the ½ TEST signal is produced, this signal is applied to the gate 139 in the stimuli subsystem and the $\overline{½\ TEST}$ signal is removed from the gate 137.

The gate 139 does not become enabled until the second and the last stages of the square wave counter 99 are switched to the binary ONE state. Therefore, the STROBE 2 pulse is delayed an additional clock pulse time for this series of tests. Under these conditions, the STROBE 2 pulse occurs when the corresponding output pulse from the test specimen is decaying. If the rate of decay is unsuitable, the comparator subsystem produces a NO GO and the test is terminated.

The ONE/ZERO generator 141 for the present tester contains 24 stages. Information in WORD 2 is applied to the ONE/ZERO generator through the gate 91 in the counter and memory subsystem. Information in WORD 2 determines the binary value of the signals applied to the various elements in the test specimen. Each stage in the ONE/ZERO signal is coupled to an individual level selector circuit in the group 143. This information is supplied to the appropriate level selector in response to a STROBE pulse through the associated gate 145.

During the course of a complete test on a given specimen, various permutations of signals will be applied so as to test the specimen under a variety of circuit conditions. In order to accomplish this, several combinations of ONE/ZERO signals must be sequentially stored in the generator 141. In a typical case, four combinations of ONE/ZERO signals will be adequate to test a given specimen. Thus, in a complete testing cycle, four individual values of WORD 2 will be supplied at various times to the generator 141.

INTERFACE SUBSYSTEM

The functions of the interface subsystem may be understood by first referring to FIG. 1. The interface serves primarily to provide suitable signal levels to various components and to interconnect the test specimen and the tester.

A circuit board 32 for a typical test is wired to receiver power from the power supply and to establish ONE level signals. The circuit board is also wired to conduct desired signals from the stimuli subsystem to appropriate input terminals on the test specimen and to conduct output signals from the test specimen to selected gates in the evaluate circuit of the comparator subsystem. The circuit board may also contain load impedances to provide suitable current drains so that the test specimen may be tested under full load conditions.

The design of the interface subsystem and the circuit boards is straightforward and requires no detailed description.

COMPARATOR SUBSYSTEM

Figure 4:
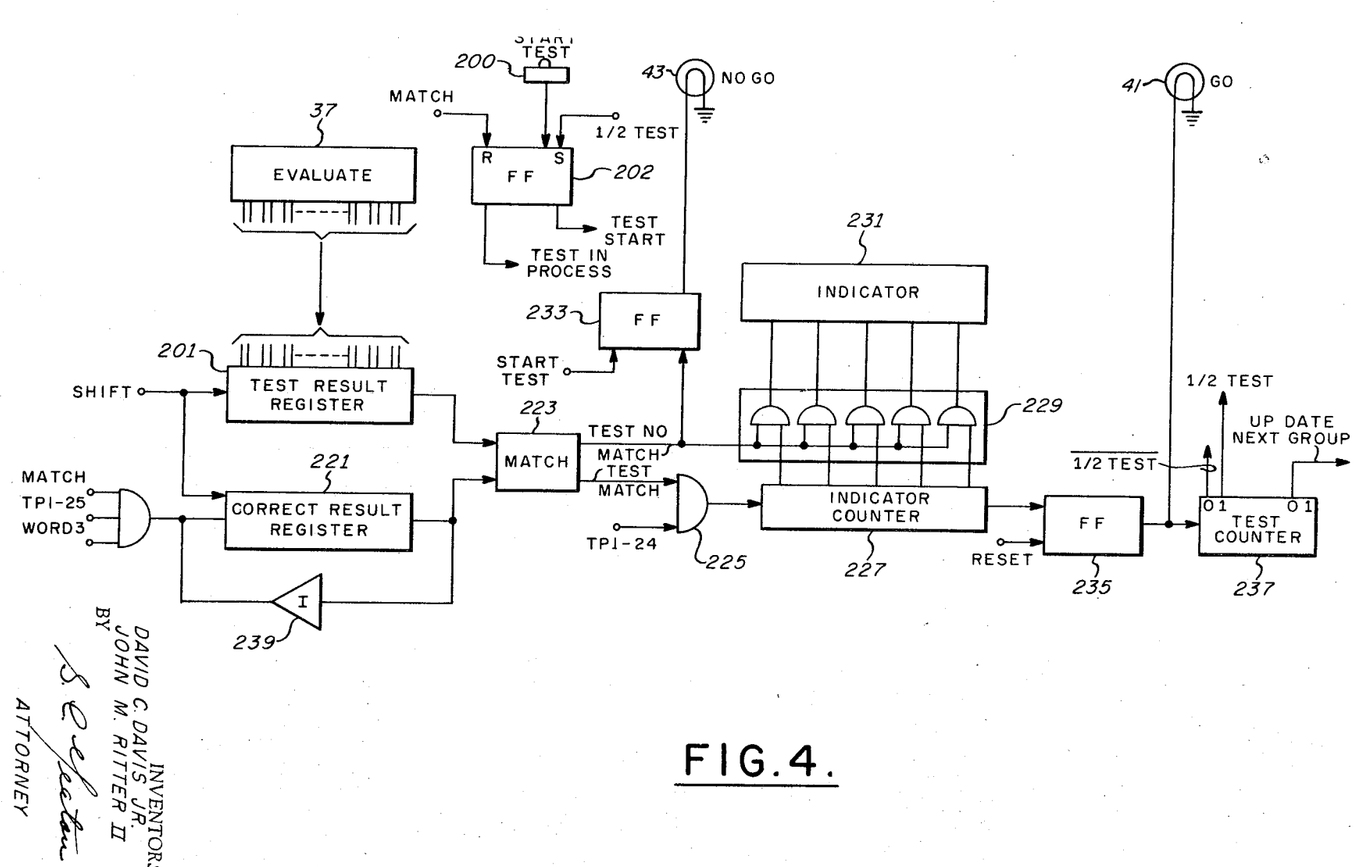
FIG. 4 is a block diagram illustrating the operation of the comparator subsystem of the presently preferred embodiment of the invention.

A typical comparator subsystem is shown in FIG. 4. A start-test button 200 is closed to initiate the testing cycle. This sets a flip-flop 202 and produces a TEST START signal that enables components in the memory and control subsystem (FIG. 2) in order to select the proper words stored in the data tracks of the magnetic memory drum. When the data being read from the memory drum matches the data being stored in the next group register 53, the match flip-flop 83 produces a MATCH signal that rests the flip-flop 202. The flip-flop 202 then produces a TEST IN PROCESS signal. This initiates the comparison cycle of the test procedure.

The evaluate circuit 37 determines whether or not the output signal bits from the test specimen have suitable amplitude and delay. The bits from the evaluate circuit are applied directly to individual stages in the test result register 201 if these bits satisfy the amplitude and delay requirements. If a signal bit from the test specimen does not meet these requirements, the evaluate circuit passes the complement of that bit to the test result register 201.

Figure 5:
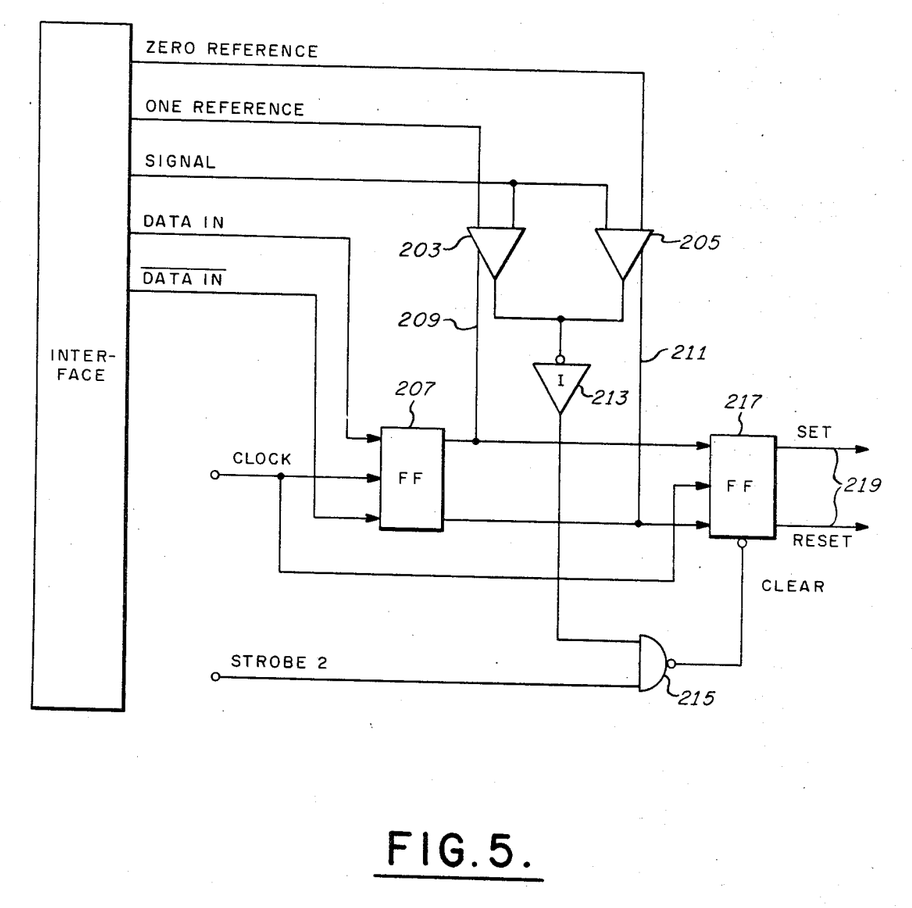
FIG. 5 is a block diagram illustrating an evaluation circuit useful in practicing the invention.

One stage of an evaluate circuit 37 is shown in block diagram form in FIG. 5. Twenty-four such stages are available in the particular tester being discussed.

A pair of reference voltages are supplied to the evaluate circuit from the interface subsystem. These voltages are ordinarily derived from the power supply. Their magnitudes are determined by conventional means such as voltage dividers included in the circuit board 32 being used for the particular test. The ZERO reference represents the maximum permissible amplitude for a ZERO bit whereas the ONE reference represents the minimum permissible amplitude for a ONE bit.

DATA IN and $\overline{\text{DATA IN}}$ signals are also received through the interface subsystem from the stimuli subsystem. These signals determine whether the binary ONE or binary ZERO level is to be evaluated in the ONE and ZERO comparators 203 and 205, respectively.

The DATA IN and $\overline{\text{DATA IN}}$ signals are used to switch the flip-flop 207 when a clock pulse is applied to this flip-flop. These signals are derived from the 20th and 21st bits in the signal generator register 100. If a DATA IN voltage is applied to the flip-flop 207, the following clock pulse will switch this flip-flop so as to enable the comparator 203 through a line 209 and disable the comparator 205 through a line 211. This prepares the circuit for evaluation of the ONE level of an incoming signal.

If the signal is lower than the ONE reference level, the comparator 203 produces a high level output. If the signal is at least as high as the reference level, the comparator 203 produces a low level output. The inverter 213 inverts the level of this signal and applies it to a gate 215.

Similarly, the comparator 205 when enabled, provides a high output if the input signal is higher than the ZERO reference level and a low output signal if the input is lower than the ZERO reference level. The inverter 213 also inverts these output signals and applies them to the gate 215.

Thus, if the amplitude of the signal from the test specimen is acceptable, a GO signal will be applied to the gate 215. If the signal from the test specimen experiences a delay within acceptable limits, a STROBE 2 pulse will occur during the time that a GO signal is being applied to the gate 215 and a CLEAR signal will be applied ot a flip-flop 217. A corresponding signal will also be applied through the lines 219 to the test result register 201 depicted in FIG. 4.

After this information has been entered into the test result register 201, it is compared with the information previously stored in the correct result register 221.

Shift signals are applied to the test result register 201 and the correct result register 221 so as to read out the information stored in these registers in a serial fashion. Corresponding bits from these two registers are compared in a match circuit 223. So long as the corresponding bits from the two registers have the same binary value, the match circuit produces a TEST MATCH signal which enables a gate 225 and permits timing pulses to be read into an indicator counter 227.

If a pair of corresponding bits from the two registers do not match, the match circuit 223 is switched so as to produce a TEST NO MATCH signal. This disables the gate 225 and holds the count in the counter 227. The TEST NO MATCH signal enables the group of gates 229. The count being held in the counter 227 is then displayed on an indicator 231. This count indicates the number of the test that failed.

The TEST NO MATCH signal also switches a flip-flop 233 which energizes a NO GO lamp 43.

If all of the corresponding bits match, however, all twenty-four bits are applied to the counter 227. The 24th bit overflows and switches a flip-flop 235. This energizes a GO lamp 41 and actuates a test counter 237.

During the first testing cycle, the counter 237 produces a ½ $\overline{\text{TEST}}$ signal. This enables the gate 137 in the stimuli subsystem so as to produce a STROBE 2 delay suitable for testing the trigger propagation time. If the test specimen passes this test, the overflow bit from the indicator counter 227 switches the test counter 237. This causes the test counter to produce a ½ TEST signal.

The ½ TEST signal again sets the flip-flop 202 so as to produce a TEST START signal. This signal, in turn, permits new information to be read into the test result register 201. However, since a ½ TEST signal is now being produced, the gate 137 in the stimuli subsystem is now disabled whereas the gate 139 in the same subsystem is enabled. This provides an additional delay for the STROBE 2 pulse and permits the fall time propagation delay to be examined.

During the original testing cycle when the information corresponding to the trigger propagation delay data are being compared with the information in the correct result register, the information from the correct result register is recirculated through an inverter 239. Thus, the correct result register and the inverter 239 function as a shift counter. When the original testing cycle is completed, each bit originally stored in the correct result register will have been inverted. During the second test cycle, therefore, an abnormally long fall time propagation delay will produce a high voltage and indicate NO MATCH.

If the tester indicates a GO condition, for this testing cycle, the test counter 237 will produce an UPDATE NEXT GROUP signal and these tests will be repeated with the next permutation of input signals. When all tests have been completed satisfactorily, a TEST OVER signal will be produced from stage 24 of the signal generator register 100 in the stimuli subsystem. This will terminate the testing on the particular test specimen.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. Apparatus for testing external electronic circuits, said apparatus comprising memory means, first memory elements in said memory means for storing information in the form of digital bits, said information defining the sequence and binary value of test signals to be applied to an external electronic circuit to be tested; second memory elements in said memory means for storing information in the form of digital bits, said information defining the signals expected from an acceptable external electronic circuit; readout means for reading out of said memory means all of the information relating to a given set of test conditions; first, second and third registered means responsive to said readout means for temporarily storing information read out of said memory means, said first and second register means being coupled to receive bits of information from said first memory elements, said third register means being coupled to receive bits of information from said second memory elements; means to connect an external electronic circuit to be tested to the testing apparatus; means to produce a first strobe pulse; means for applying voltages representing the bits of information stored in the first and second register means to said external electronic circuit in response to a first strobe pulse; means to produce a second strobe pulse that is delayed a first predetermined time with respect to a corresponding first strobe pulse; evaluation means coupled to receive output signals in the form of digital bits from said external electronic circuit, said evaluation means being further coupled to receive said second strobe pulse; said evaluation means being constructed and arranged to compare the amplitude of output signals from said external electronic circuit with predetermined reference voltages during the occurrence of a second strobe pulse; a test result register coupled to said evaluation means for temporarily storing the digital bits representing the output signals from said evaluation means; comparison means for serially comparing the binary value of each bit in the test result register with the corresponding bit in said third register; means coupled to said comparison means for terminating the testing cycle whenever the comparison means detects a pair of corresponding bits of opposite binary value; and indicating means to produce a GO signal when said comparison means detects agreement between each pair of corresponding bits for a given set of test conditions.

2. The apparatus of claim 1 in which the correct result register is a shift counter; said apparatus further including counting means to produce a ½ TEST signal when said indicating means is first actuated during a series of tests on a given external electronic circuit; means to initiate a second test cycle on said given external electronic circuit in response to a ½ TEST signal; and means to provide a second predetermined delay for said second strobe pulse during the occurrence of a ½ TEST signal.

3. The apparatus of claim 2 in which the counting means further includes means to terminate the ½ TEST signal and to provide an UPDATE signal whenever said indicating means is actuated during a second test cycle; and means in said readout means to read into said first, second and third register means all of the information relating to a second set of test conditions in response to an UPDATE signal.

4. The apparatus of claim 2 in which said first predetermined delay is equal to the trigger propagation delay that would occur in an acceptable given electronic circuit under test and said second predetermined delay is equal to the fall time propagation delay that would occur in an acceptable given electronic circuit under test.

5. The apparatus of claim 1 in which the memory means further contains third memory elements for storing the addresses of said first memory elements and said second memory elements; said apparatus further containing a next group register; means to preset the next group register to a count representing a desired address; means in said readout means for scanning said third memory elements; means to produce a MATCH signal when the address being read out of said memory means is the same as that represented by the count preset in the next group register, and in which said readout means is enabled by said MATCH signal.

6. The apparatus of claim 1 in which said evaluation means includes means to provide a reference voltage of known amplitude; comparator means to compare the amplitude of a reference voltage with that of a signal to be evaluated; means in the output of said comparator means to provide an inverted signal when the amplitudes of the signal to be evaluated and the reference voltage agree within a predetermined tolerance; and gating means coupled to receive said inverted signals and said second strobe pulses, said gating means being constructed and arranged to provide an evaluation output signal when a second strobe pulse and an inverted signal occur together.

7. The apparatus of claim 1 in which said evaluation means includes means to provide a ZERO reference voltage and a ONE reference voltage; first and second comparator means coupled to receive said ZERO and ONE reference voltages respectively, each of said comparator means being further coupled to receive a signal to be evaluated; means to select one of said comparator means for evaluating a given signal; means coupled to the output of each of said comparator means to provide a GO signal whenever the amplitudes of the signal to be evaluated and the reference voltage applied to the selected comparator agree within a predetermined tolerance; and gating means coupled to receive a GO signal and a second strobe pulse, said gating means being constructed and arranged to produce an output signal from said evaluation means whenever a second strobe pulse occurs during the occurrence of a GO signal.

References Cited

UNITED STATES PATENTS 3,418,573   12/1968   Alford ______________ 324—73

RUDOLPH V. ROLINEC, Primary Examiner

E. L. STOLARUN, Assistant Examiner

U.S. Cl. X.R.

324—158